(12) United States Patent
Clavijo Lumbreras (10) Patent No.: US 8,578,928 B2
(45) Date of Patent: Nov. 12, 2013

(54) DIRECTABLE SOLAR PANEL SYSTEMS

(75) Inventor: Ruben Clavijo Lumbreras, Lardero (ES)

(73) Assignee: Talleres Clavijo, S.L., Viana (Navarra) (ES)

(*) Notice: Subject to any disclaimer, the term of this patent is extended or adjusted under 35 U.S.C. 154(b) by 277 days.

(21) Appl. No.: 13/120,588

(22) PCT Filed: Apr. 27, 2009

(86) PCT No.: PCT/ES2009/000225
§ 371 (c)(1),
(2), (4) Date: Mar. 23, 2011

(87) PCT Pub. No.: WO2010/034851
PCT Pub. Date: Apr. 1, 2010

(65) Prior Publication Data
US 2011/0174295 A1    Jul. 21, 2011

(30) Foreign Application Priority Data
Sep. 24, 2008 (ES) .................... 200802702

(51) Int. Cl.
*F24J 2/38* (2006.01)

(52) U.S. Cl.
USPC ........... 126/600; 126/601; 126/602; 126/603; 126/604; 126/605; 126/606; 126/607; 126/608

(58) Field of Classification Search
USPC .................... 126/600–608; 136/244
See application file for complete search history.

(56) References Cited

U.S. PATENT DOCUMENTS

| | | | | |
|---|---|---|---|---|
| 4,145,021 A * | 3/1979 | Gaechter et al. | ............... | 248/371 |
| 4,245,895 A * | 1/1981 | Wildenrotter | ................. | 359/848 |
| 4,501,469 A * | 2/1985 | Merges et al. | ................ | 359/849 |
| 5,143,556 A * | 9/1992 | Matlin | ........................... | 136/244 |
| 6,123,067 A * | 9/2000 | Warrick | ......................... | 126/593 |
| 6,672,018 B2 * | 1/2004 | Shingleton | ................... | 52/173.3 |
| 7,240,674 B2 * | 7/2007 | Patterson | ...................... | 126/573 |
| 7,374,137 B2 * | 5/2008 | Staney | ........................ | 248/122.1 |
| 7,763,835 B2 * | 7/2010 | Romeo | ........................ | 250/203.4 |
| 2003/0070368 A1 * | 4/2003 | Shingleton | ................... | 52/173.3 |
| 2005/0284467 A1 * | 12/2005 | Patterson | ...................... | 126/580 |
| 2006/0054162 A1 * | 3/2006 | Romeo | ........................ | 126/600 |
| 2006/0096586 A1 * | 5/2006 | Hayden | ........................ | 126/600 |
| 2009/0032084 A1 * | 2/2009 | Aiken et al. | .................. | 136/246 |

FOREIGN PATENT DOCUMENTS

| | | | |
|---|---|---|---|
| EP | 1998122 A1 | | 12/2008 |
| ES | 2281307 A1 | * | 9/2007 |
| ES | 2298068 A1 | | 5/2008 |
| ES | 2326204 | | 10/2009 |

* cited by examiner

*Primary Examiner* — Kenneth Rinehart
*Assistant Examiner* — Jorge Pereiro
(74) *Attorney, Agent, or Firm* — Lucas & Mercanti, LLP (57) ABSTRACT

The invention relates to improvements in orientable solar panel array systems of the type of solar panel arrays comprising a plurality of panels (1) for capturing solar radiation, arranged on a bearing structure pivotally assembled with respect to a horizontal tube (3), which in turn is rotatably assembled on the end of a support column (2), the structure bearing the panels (1) comprising two parallel trusses (4) on which trusses a series of longitudinal profiles with a C-shaped cross-section are transversely arranged, on which longitudinal profiles sliding profiles (6) with a square cross-section having an open groove in the upper part are perpendicularly arranged, on which sliding profiles the panels (1) are fastened.

5 Claims, 9 Drawing Sheets

DIRECTABLE SOLAR PANEL SYSTEMS

This application is a National Phase of International Application PCT/ES2009/000225, filed Apr. 27, 2009, which claims the priority of Spanish application No. P 200802702, filed Sep. 24, 2008, both applications are incorporated by reference, herein.

FIELD OF THE ART

The present invention relates to solar panel arrays that are arranged in an orientable assembly to track the position of the sun in order to capture maximum solar incidence, proposing improvements of the structural and functional features of the system of Spanish Patent P200702786.

STATE OF THE ART

The arrangement of solar panel arrays rotatably assembled on a support column for the azimuthal orientation of the system is known, the solar panel array assembly further being established in an inclined pivoting arrangement on a horizontal axis.

Spanish Patent P200702786 relates to a system of this type, in which the solar panel array is made up of a structure formed by a frame on which a plurality of transverse belts are arranged, on which the panels making up the solar panel array are fastened, the coupling of said structural assembly of the solar panel array with respect to the support column being established by means of a horizontal tube to which a bushing is attached in the central area by means of which the rotating assembly on the end of the support column is determined.

The coupling of the pivoting assembly of the solar panel array is further established on the ends of said horizontal tube by means of articulated connections, cylinders which actuate the pivoting being arranged in relation to these connections.

OBJECT OF THE INVENTION

The present invention proposes improvements affecting the structural and functional features of the embodiment referred to in Spanish Patent P200702786, improving the conditions for the assembly and operation of said embodiment.

According to the improvements herein proposed, the structure bearing the panels making up the solar panel array is made up of two parallel trusses on which there is arranged a series of transverse profiles with a C-shaped cross-section which are anchored on the trusses by means of inverted U-shaped clamps, sliding profiles having a square cross-section with an open groove in the upper part being incorporated in a perpendicular direction on said transverse profiles with respect to which the panels making up the solar panel array are arranged, which panels are fastened on said sliding profiles by means of gripping anchors provided with tamper-proof screws.

A very simple and easy to assemble solar panel array with a safe formation and high resistance is thus obtained.

According to another feature of the improvements of the invention, linear actuators operated by electric motors are arranged in the articulated connections of the pivoting assembly of the solar panel array, whereby a very precise operation for inclining the solar panel array for solar tracking is achieved.

The fastening of the rotating assembly of the assembly bearing the solar panel array on the support column is established by means of a bushing which is connected to the horizontal tube on which the articulations of the pivoting assembly are determined, reinforcement brackets being included in said connection between the bushing and the horizontal tube, rings bracing the tube are further incorporated, on which rings the bushing is also fixed, a very strong connection thus being achieved to withstand the stresses exerted by the weight of the solar panel array and by the incidence caused by the wind in that connection of the support.

DETAILED DESCRIPTION OF THE INVENTION

The object of the invention relates to an orientable solar panel array such as that of Spanish Patent P200702786, but with improvements of the structural embodiment and the functional behaviour of the solar panel array.

Figure 1:
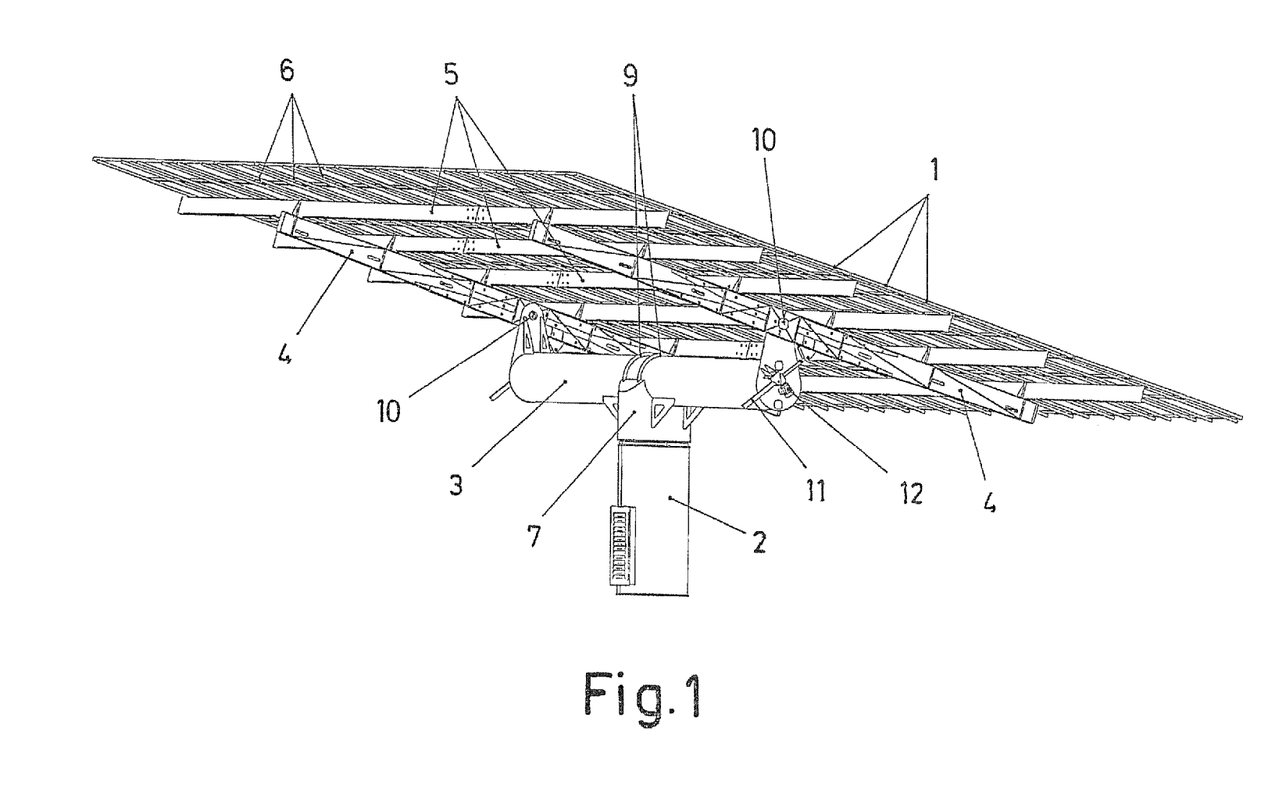
FIG. 1 shows a perspective view of a solar tracker structured according to the invention.

This solar panel array is of the type comprising a structural assembly bearing many panels (1) for capturing solar radiation, said assembly being rotatably assembled for azimuthal orientation on a support column (2), and pivotally assembled for inclination allowing the vertical orientation.

Figure 5:
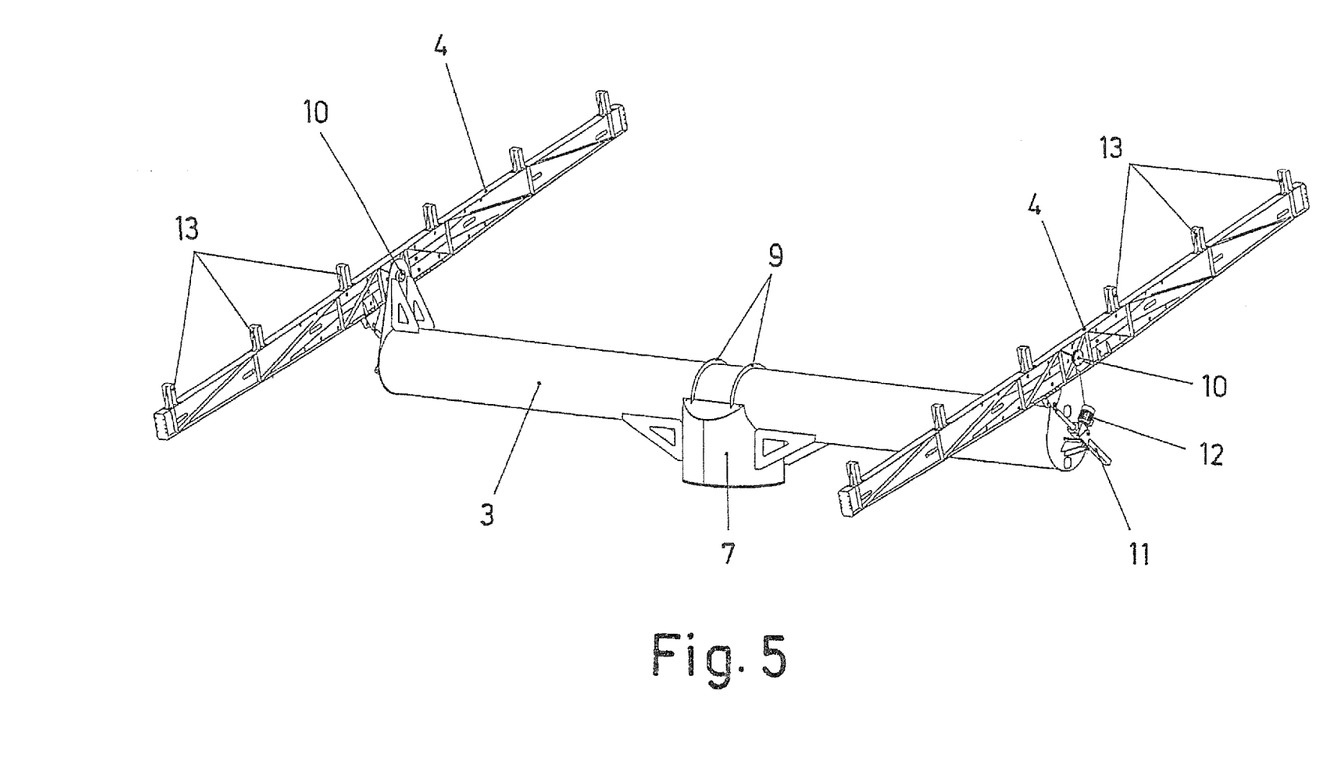
FIG. 5 is a perspective view of the horizontal tube with the trusses for fastening the structure of the solar panel array.
Figure 7:
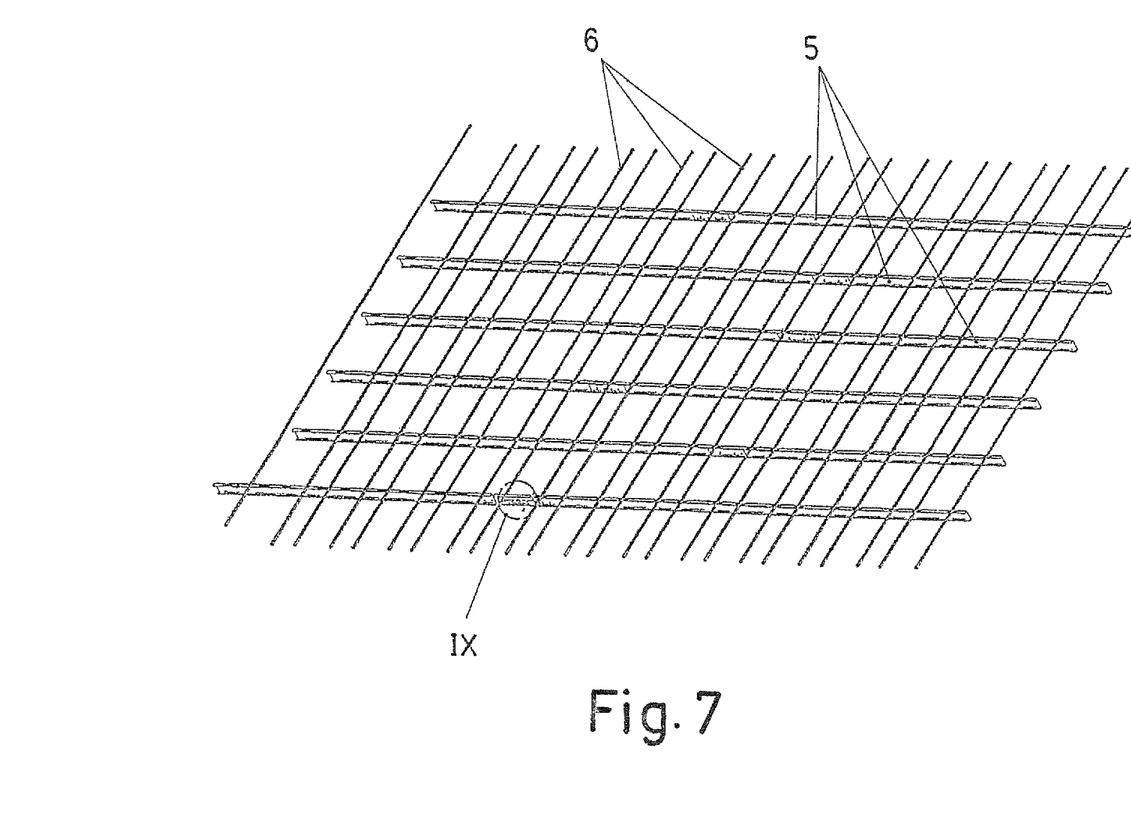
FIG. 7 is a perspective view of the structural assembly intended for arranging thereon the panels making up the solar panel array.

The structural assembly bearing the panels (1) making up the solar panel array consists of a horizontal tube (3) on the ends of which there are articulated two parallels trusses (4) on which there are transversely incorporated longitudinal profiles (5) with a C-shaped cross-section, on which longitudinal profiles there are in turn arranged sliding profiles (6) perpendicular thereto having a square cross-section with an open groove in the upper part, the fastening of the panels (1) making up of the solar panel array being established on said sliding profiles.

Figure 2:
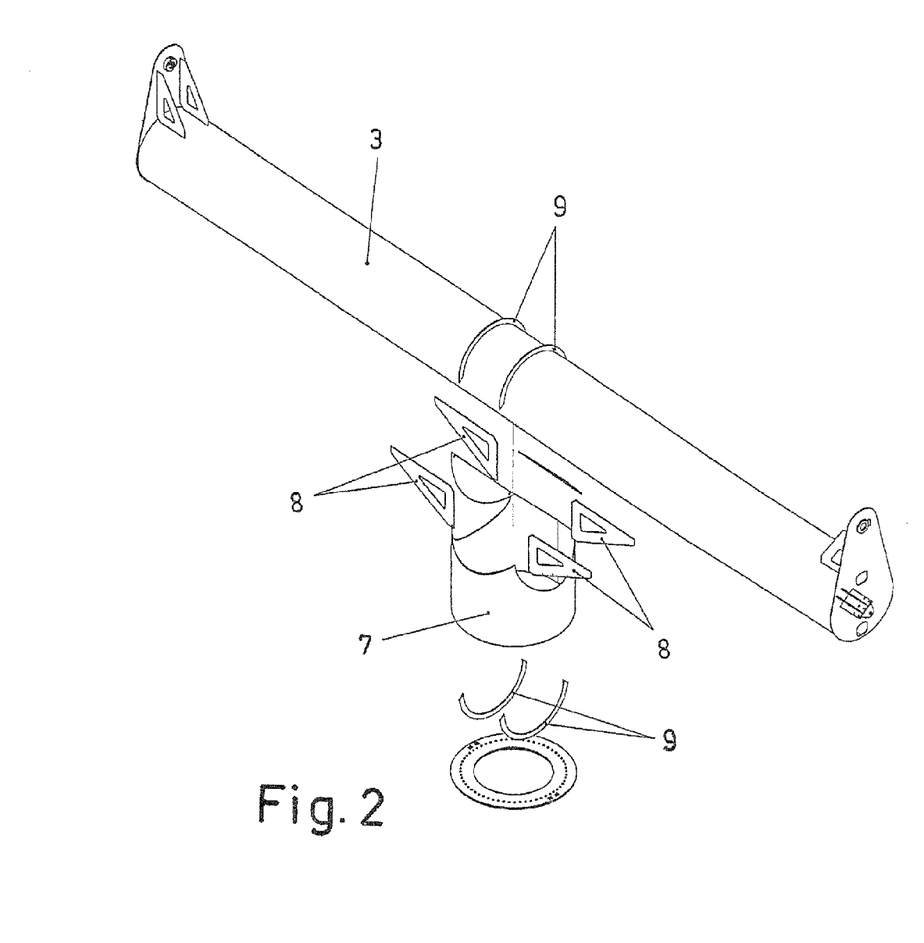
FIG. 2 is an exploded perspective view of the connection between the bushing and the horizontal tube for supporting solar panel array.
Figure 3:
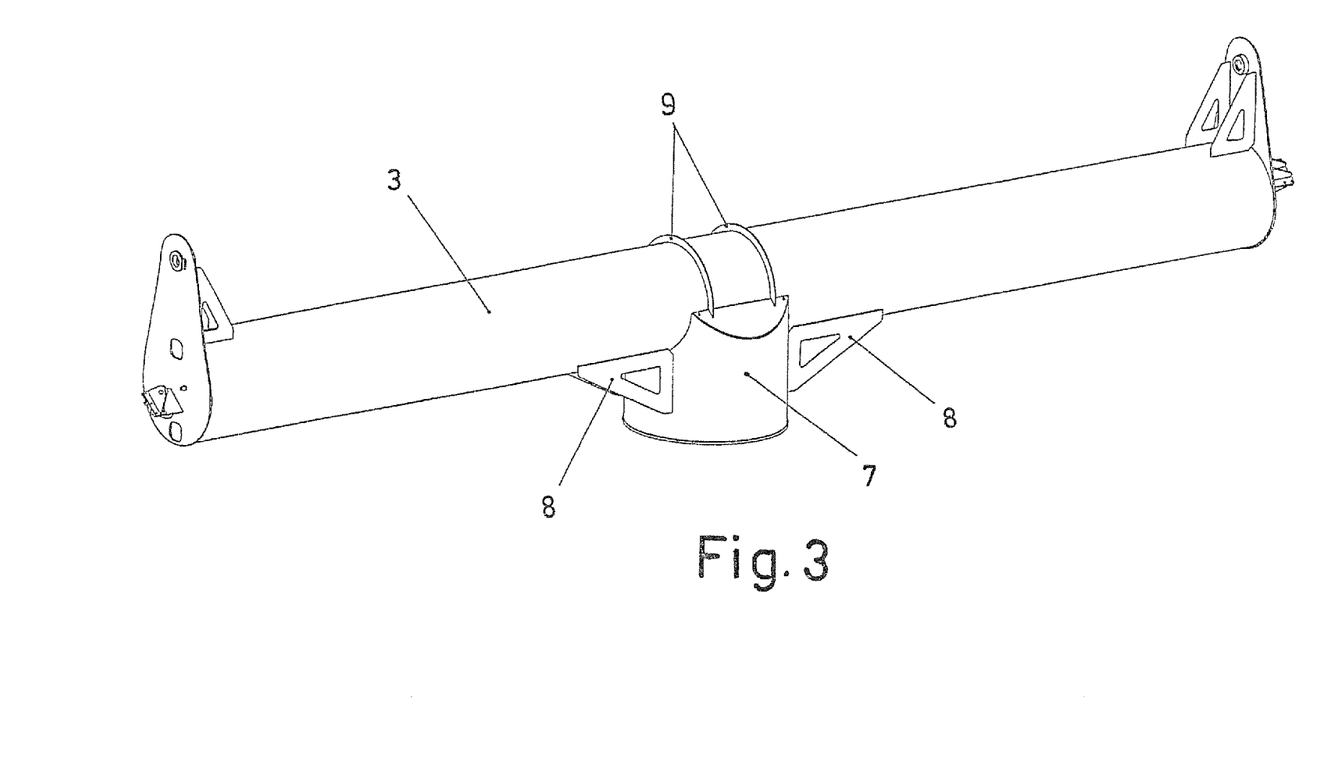
FIG. 3 is a perspective view of the assembly of the preceding figure once assembled.
Figure 4:
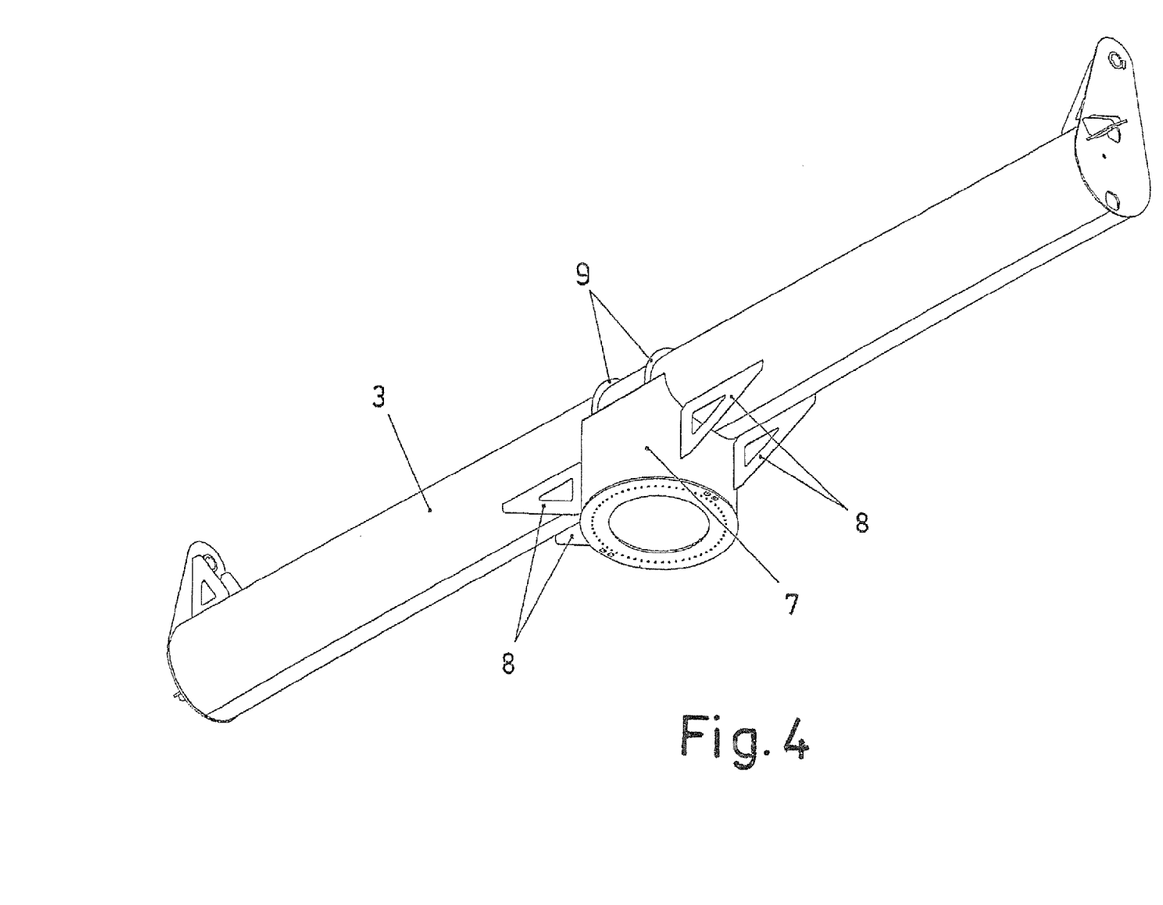
FIG. 4 is a perspective view of the same assembly as above from another angle of observation.

The horizontal tube (3) incorporates a bushing (7) connected integrally in its middle area by means of which the coupling for the rotating assembly on the support column (2) is established, said connection of the bushing (7) on the horizontal tube (3) including reinforcement brackets (8) as well as rings (9) bracing the tube (3) and on which the bushing (7) is in turn fixed, a very strong connection thus being achieved.

Figure 6:
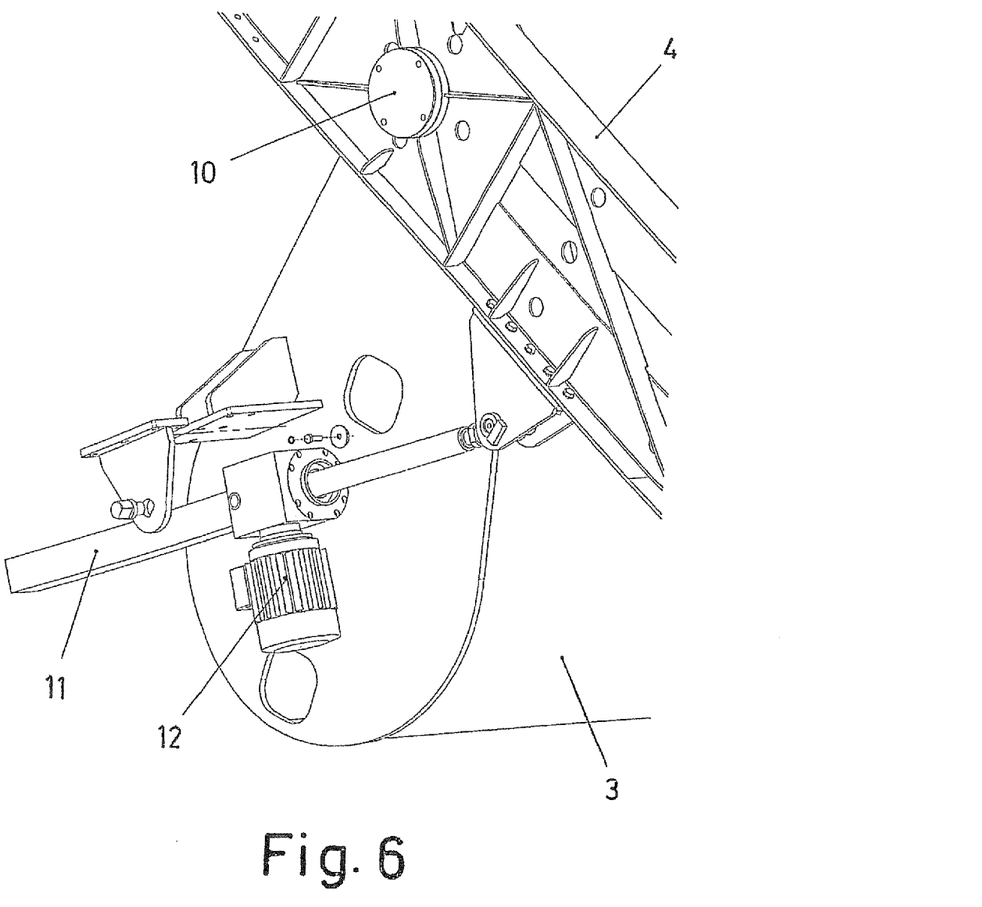
FIG. 6 is an enlarged perspective view of a detail of one of the articulations of the pivoting assembly of the solar panel array.

The pivotal assembly of the assembly bearing the panels (1) making up the solar panel array is established by means of articulated connections (10) of the trusses (4) on the ends of the horizontal tube (3), linear actuators (11) which are operated by electric motors (12) being arranged on said connections, whereby an action which pivots the assembly bearing the solar panel array is exerted, allowing a high precision movement in that direction for solar tracking.

Figure 9:
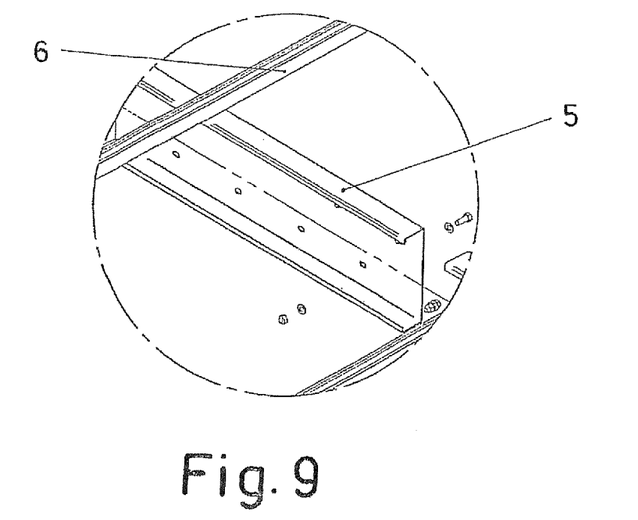
FIG. 9 is an enlarged detail of the area IX indicated in FIG. 7.

In the assembly bearing the panels (1) making up the solar panel array, the longitudinal profiles (5) are fastened on the trusses (4) by means of inverted U-shaped clamps (13) which are fixed with screws on the trusses (4), bracing the profiles (5) thereagainst.

Figure 8:
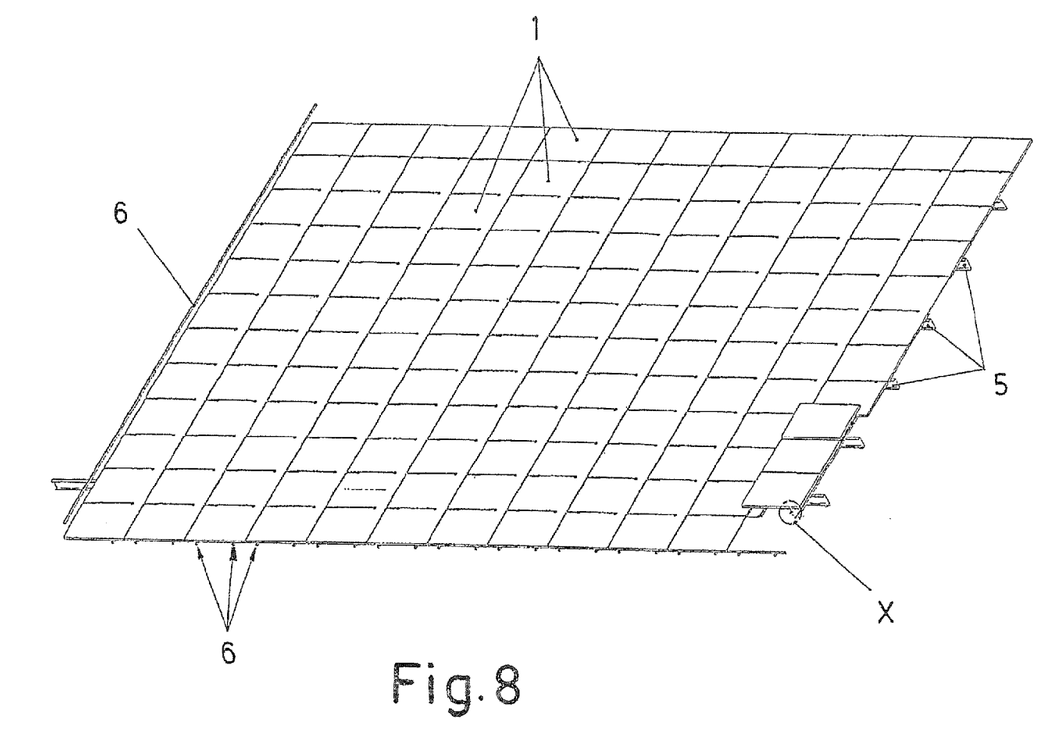
FIG. 8 is a perspective view of the assembled solar panel array, with some panels making it up being raised with respect to the assembly position.
Figure 10:
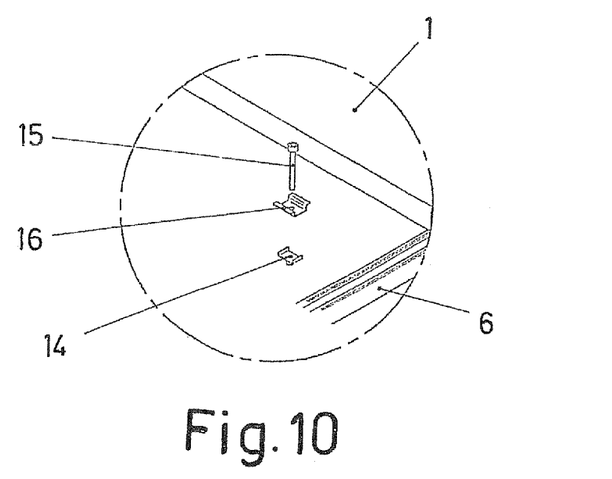
FIG. 10 is an enlarged detail of the area X indicated in FIG. 8.

The sliding profiles (6) are fixed directly on the longitudinal profiles (5) by means of anchoring with screws, plates (14) provided with a welded nut being housed in said sliding profiles (6), with respect to which plates corresponding tamper-proof screws (15) are incorporated, which screws protrude through the upper groove of the corresponding sliding profile (6), passing through respective inverted omega-shaped parts (16), whereby gripping the edge of the panels (1) making up the solar panel array, such that when the screw (15) is tightened, traction is exerted between the plate (14) and the part (16), determining a tightening which ensures the fastening of the gripped panel (1).

The assembly of the solar panel array is thus very simple and fast to perform, a rigid and strong structural assembly being achieved on which there are arranged panels (1) making up the solar panel array, which array is also very strongly fastened on the support column (2) in an orientation arrangement that is very effective for solar tracking.

The invention claimed is:

1. An orientable solar panel array systems comprising:
   a structural assembly;
   a plurality of panels for capturing solar radiation mounted on the structural assembly;
   a support column having a rotatable bushing on an upper end of the support column;
   a horizontal tube connected to the bushing by reinforcing rings by bracing the tube;
   a pivotal assembly for pivoting the panels is mounted on each end of the horizontal tube and connects the horizontal tube to the structural assembly;
   the structural assembly having two parallel trusses, each connected to one of each pivotal assembly,
   a plurality of longitudinal profiles with a C-shaped cross-section transversely fastened on said trusses,
   a plurality of longitudinal sliding profiles with a plurality of square cross-section having an open groove in an upper part of the sliding profiles arranged perpendicularly on the longitudinal profiles,
   the panels being incorporated on the sliding profiles, which panels are fastened by gripping anchors on said sliding profiles.

2. The orientable solar panel array systems according to claim 1, wherein the longitudinal profiles of the structural assembly are fastened on the trusses by means of inverted U-shaped clamps, which are fixed on the trusses with screws bracing the profiles thereagainst.

3. The orientable solar panel array systems according to claim 1, wherein the sliding profiles are fixed directly on the longitudinal profiles by means of anchoring with screws.

4. The orientable solar panel array systems according to claim 1, wherein the panels for capturing solar radiation are fastened on the sliding profiles by a plate provided with a welded nut which is housed inside the corresponding sliding profile, and an inverted omega-shaped part, which grips an edge of the panel, said omega-shaped part connected to the plate by a tamper-proof screw, the tightening of the screw determines the fastening grip of the panel which is fastened by the omega-shaped part.

5. The orientable solar panel array systems according to claim 1, wherein the pivotal assembly comprises a linear actuator operated by electric motor and an articulation which connects the trusses and the horizontal tube.

\* \* \* \* \*